May 21, 1929.  M. W. ASKIN  1,714,068

ANIMAL TRAP

Filed Aug. 3, 1927

Inventor

Morris W. Askin

Patented May 21, 1929.

1,714,068

UNITED STATES PATENT OFFICE.

MORRIS W. ASKIN, OF WASHINGTON, DISTRICT OF COLUMBIA.

ANIMAL TRAP.

Application filed August 3, 1927. Serial No. 210,323.

This invention relates to animal traps, such as mouse traps, rat traps and the like, and has for its object so to construct such traps that they can be set without fear of shock, owing to the catch releasing its hold prematurely whilst the trap is in the hand and that the bait cannot be removed or eaten up without releasing the catch.

The main object of this invention is to have a trap where a child or the ladies could just take and lay it down and it should be already set to catch the rat, so the folks unskilled in the art of setting traps shall be independent to clean up the premises of little mice before they become large and multiply, and not have to ask somebody to set the trap for them. It will eliminate the urgly handling of traps and people will be more contented to buy them by the box, as as they will be very cheaply sold in large quantities, and there would be no excuse of having rats, because I will catch them quicker than they will breed, and as soon as the contraption has done its work throw it away with the rat and put a new one in service.

One of the chief features of this invention is that the bait itself serves as a rigid element or detent means for the killing mechanism. Thus the bait may be a part of the rigid means to hold the lever that holds the killing mechanism.

Another of the chief features of this invention is that the bait is imbedded in an opening of the base of the contraption and on the surface of the opening is provided a thread to be in the way to the access of the bait, and the animal before even getting the bait will naturally break the thread or threads or any paper or cheesecloth in order to get the bait, and as soon as the thread or cheesecloth has been damaged the trap will act. This will enable to make a sure catch before all the bait has been eaten away.

And a further object is to provide a principle that will enable to manufacture the traps cheaper than the present animal traps, or by applying my invention the present traps could be converted into the principle of animal traps embodying my invention.

Figure 1:
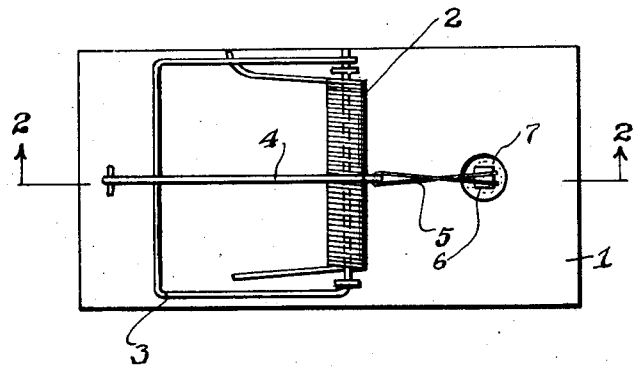
Figure 1 is a general view of a mouse trap, showing my trap in set position.
Figure 2:
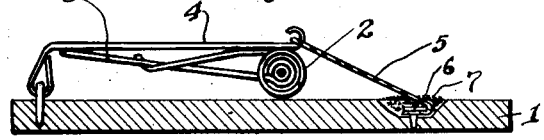
Figure 2 is a longitudinal vertical section through the trap in the set position embodying the new invention.
Figure 3:
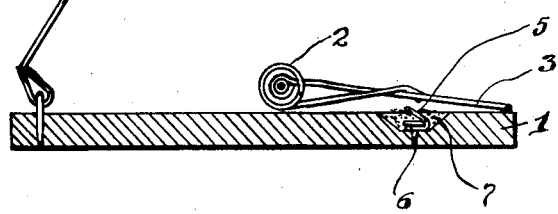
Figure 3 is a longitudinal vertical section through the trap in the released position after the string or the link is broken and the catching mechanism is discharged.

Referring to Figure 1, which illustrates a mouse trap, No. 1 designates the board, No. 2 is a helical spring, No. 3 is the killing member, and No. 4 is the lever that holds the killing member down before discharging by the force of the spring No. 2. No. 5 is the new member of this invention that is composed of a tissue or piece of cheesecloth, or same could be saturated with any baiting substance. No. 6 is a pin or nail securely fastened to the base and serves to hold the string or baiting member. No. 7 is the recess where the bait is stuffed in and it covers the pin No. 6.

Figure 4:
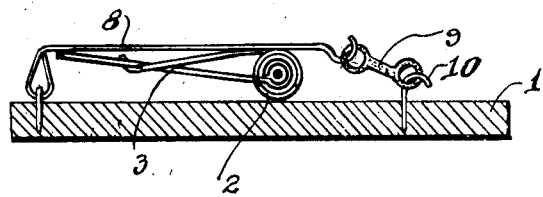
Figure 4 is a general longitudinal view of a trap with a link of bait to hold the mechanism in readiness for action.

No. 4 in Figure 4 is the modified member that holds the killing member. This modified member No. 4 is made just a little longer to enable No. 9 to be of a shorter dimension. This member No. 9 is just a link composed of bait in its rigid form.

No. 10 is a hook fastened to the base No. 1 for repeatedly setting the trap by a new bait link No. 9.

Now, describing the action of this new trap, in Figure 1 the general trap board with the new member No. 5 holding member No. 4 is a set position by means of No. 6. No. 6 has somewhat sharp edges, and when the mouse is just about moving away the thread No. 5 from the bait in the No. 7 any movement helps to cut the string on the sharp edge; and, notwithstanding the fact that the mouse would break it with its sharp teeth, it has the possibilities of cutting the string at the sharp edges. This string obstructs the free access to the bait and the mouse would want to get rid of it in order to get the bait without interference, and as soon as this string breaks the lever No. 4 is released and the killing member No. 3 is catching the mouse.

In the modified form as shown in Figure 4 the same mechanism is used, with the exception that lever No. 4 is made somewhat longer to receive the baiting link No. 9 connected to hook No. 10, so when the mouse eats away a portion of the bait link it will break and the trap will be released and catch in its ordinary way.

While one is a modification of the other, but the principle is about the same, the main object is to catch the animal before it satisfies its hunger, where if it takes some bait and gets away the next animal is paying the price for the first one.

This trap could be set even in the factory and shipped to any point already set. The ladies especially would buy them like animal crackers and just put them in places where they want to catch the mouse. All the fear of premature discharge is eliminated and accidental discharges are impossible, and, if desired, could be reset many times, provided there is no blood on the contraption.

The release of this trap depends on new principles, namely, the trap will spring before the mouse gets away with most of the bait.

I declare that what I claim is:

1. In a mouse trap, a platform, a break back killing member, a latching lever crossing the killing member to hold the trap set, one end of said latching lever being pivoted to the base, a mechanically strong edible bait link having its ends spaced and formed to constitute attaching devices, a link engaging device on the free end of the lever, and a second link engaging device on the base and positioned to permit the link to engage the first and second devices upon the trap being set.

2. In a mouse trap, a platform, a break back killing member, a latching lever crossing the killing member to hold the trap set, one end of said latching lever being pivoted to the base, an elongated bait link having a central slender body portion provided with a head at each end, means carried by the free end of the lever to engage one of said heads, and means fixed on said base for engaging the remaining head upon the trap being set.

In witness whereof, I have hereunto signed my name, this 3rd day of August, 1927.

MORRIS W. ASKIN.